US008966862B2

(12) United States Patent
Kim et al.

(10) Patent No.: US 8,966,862 B2
(45) Date of Patent: Mar. 3, 2015

(54) LARGE SCALE CONCRETE GIRDER USING UHPC MEMBER AS FORM AND STRUCTURAL ELEMENT AND ITS MANUFACTURING METHOD

(71) Applicant: Korea Institute of Construction Technology, Goyang-si, Gyeonggi-do (KR)

(72) Inventors: Young Jin Kim, Goyang-si (KR); Jong Sup Park, Goyang-si (KR); Jeong Rae Cho, Paju-si (KR); Young Hwan Park, Goyang-si (KR); Byung Suk Kim, Goyang-si (KR)

(73) Assignee: Korea Institute of Construction Technology, Goyang-si, Gyeonggi-do (KR)

( * ) Notice: Subject to any disclaimer, the term of this patent is extended or adjusted under 35 U.S.C. 154(b) by 0 days.

(21) Appl. No.: 14/032,011

(22) Filed: Sep. 19, 2013

(65) Prior Publication Data

US 2014/0096476 A1 Apr. 10, 2014

(30) Foreign Application Priority Data

Oct. 4, 2012 (KR) ........................ 10-2012-0109860

(51) Int. Cl.
*E04B 1/20* (2006.01)
*B29D 99/00* (2010.01)
*B28B 1/00* (2006.01)

(52) U.S. Cl.
CPC .............. *E04B 1/20* (2013.01); *B29D 99/0003* (2013.01); *B28B 1/002* (2013.01)
USPC .................... 52/841; 52/600; 52/606; 52/607

(58) Field of Classification Search
CPC .......... B29D 99/0003; E04B 1/20; E01D 2/02
USPC ........... 52/837–839, 841–844, 848, 600–601, 52/606–607
See application file for complete search history.

(56) References Cited

U.S. PATENT DOCUMENTS

| | | | | | |
|---|---|---|---|---|---|
| 863,555 | A * | 8/1907 | Poole | ............................. | 52/423 |
| 1,214,964 | A * | 2/1917 | Small | ............................. | 52/600 |
| 1,665,442 | A * | 4/1928 | Campbell | ....................... | 52/509 |
| 1,821,355 | A * | 9/1931 | Murray | ........................... | 52/336 |
| 1,892,225 | A * | 12/1932 | Venzie | ........................... | 52/778 |
| 5,425,152 | A | 6/1995 | Teron | | |

(Continued)

FOREIGN PATENT DOCUMENTS

| | | |
|---|---|---|
| KR | 10-2010-0073388 | 7/2010 |
| KR | 10-2010-0074742 | 7/2010 |

(Continued)

*Primary Examiner* — Jeanette E Chapman
(74) *Attorney, Agent, or Firm* — Fenwick & West LLP

(57) ABSTRACT

A concrete girder includes a pair of ultra high performance concrete (UHPC) side form members, each having a lower flange and a web perpendicular thereto, extending in the longitudinal direction and being prepared with UHPC by using a precast, the pair of UHPC side form members being disposed in parallel so that lateral side surfaces of the lower flanges are successively positioned; and concrete placed in a space between the pair of UHPC side form members so that the placed concrete is integrated with the pair of UHPC side form members to form both traverse side surfaces thereof and the lower flange forms a lower flange thereof.

2 Claims, 20 Drawing Sheets

(56) References Cited

U.S. PATENT DOCUMENTS

| | | | | | |
|---|---|---|---|---|---|
| 6,054,197 | A * | 4/2000 | Rastegar | ...................... | 428/35.7 |
| 6,803,083 | B2 * | 10/2004 | Ensinger | ...................... | 428/36.5 |

FOREIGN PATENT DOCUMENTS

| | | | | |
|---|---|---|---|---|
| KR | 2012054705 | A | * | 5/2012 |
| KR | 2012054706 | A | * | 5/2012 |

* cited by examiner

LARGE SCALE CONCRETE GIRDER USING UHPC MEMBER AS FORM AND STRUCTURAL ELEMENT AND ITS MANUFACTURING METHOD

CROSS-REFERENCE TO RELATED APPLICATION

This application claims priority to Korean Patent Application No. 10-2012-0109860, filed on Oct. 4, 2012, and all the benefits accruing therefrom under 35 U.S.C. §119, the contents of which in its entirety are herein incorporated by reference.

BACKGROUND

1. Field

The present disclosure relates to a large scale concrete girder and its manufacturing method, and more particularly, to a large scale concrete girder manufactured by using an Ultra High Performance Concrete (UHPC) beam as a form and a structural member and its manufacturing method.

2. Description of the Related Art

When a concrete girder is manufactured by casting concrete, forms made of plates are respectively installed at end surfaces in the longitudinal direction of the concrete girder, traverse side surfaces, and a bottom surface. A form is a member which is used only for containing concrete to form a concrete girder. The form is a temporary member which will be dissembled and removed after the concrete is completely cured.

In case of making a large scale concrete girder, a placing pressure of concrete applied to the form also increases. Therefore, in order to prevent the form from deforming, a support member for preventing the increase of thickness of the form or the deformation of the form should be installed. In order to prevent deformation of the form, the form is made of steel. Accordingly, the weight of the form increases, which gives great difficulty in handling the form and also greatly increases costs for making the form.

In addition, in case of making a large scale concrete girder, in order to meet the design strength of the concrete girder, a large amount of reinforcing bars or tendons should be placed in the concrete. If a large amount of tendons are disposed or if the tensile force of the tendons is increased, a great bearing pressure is applied to both longitudinal ends of the concrete girder due to the settlement of the tendons, which increases the possibility of bearing failure.

SUMMARY

The present disclosure is directed to reducing inconvenience, costs and working time, required for temporarily installing a form and then dissembling the form again in order to form traverse side surfaces of a concrete girder, when manufacturing a large scale concrete girder.

The present disclosure is also directed to effectively improving the strength of a large scale concrete girder.

The present disclosure is also directed to improving durability and a resistance against contaminants of a large scale concrete girder.

The present disclosure is also directed to allowing an enlargement of a scale of a concrete girder by introducing a large tensile force with tendons without causing a bearing failure at both longitudinal ends of the concrete girder due to the settlement of the tendons.

The present disclosure is also directed to improving economic feasibility and efficiency when manufacturing a large scale concrete girder since an additional support member needs not be installed at the form in preparation for a placing pressure of concrete.

In one aspect, there is provided a concrete girder, which includes a pair of Ultra High Performance Concrete (UHPC) side form members, each having a lower flange and a web perpendicular thereto, extending in the longitudinal direction and being prepared with UHPC by using a precast, the pair of UHPC side form members being disposed in parallel so that lateral side surfaces of the lower flanges are successively positioned; and concrete placed in a space between the pair of UHPC side form members so that the placed concrete is integrated with the pair of UHPC side form members to form both traverse side surfaces thereof and the lower flange forms a lower flange thereof. In another aspect, there is provided a manufacturing method of such a concrete girder.

In the concrete girder of the present disclosure and its manufacturing method, the lower flange of the UHPC side form member may be divided based on the web into an inner flange located toward a UHPC side form member adjacent thereto in the traverse direction and an outer flange located opposite thereto; a concave portion may formed at an upper edge of an outer side end of the inner flange; a reinforcing bar protruding in the traverse direction may be provided at the concave portion; when the lower flanges of the pair of UHPC side form members are arranged in parallel to contact in the traverse direction, the reinforcing bar may be located in the concave portions of the UHPC side form members which face each other; and when the concrete placed in the concrete placing space fills the concave portion, the reinforcing bar may be buried in the concrete so that the inner flanges are integrated with each other by means of the concrete and the reinforcing bar buried therein.

In addition, in the concrete girder of the present disclosure and its manufacturing method, the lower flange of the UHPC side form member may be divided based on the web into an inner flange located toward a UHPC side form member adjacent thereto in the traverse direction and an outer flange located opposite thereto; concave portions may be formed at an upper edge of an outer side end of the inner flange with an interval in the longitudinal direction, and a convex portion may be formed between the concave portions; a through hole may be formed in the convex portion in the longitudinal direction; a reinforcing bar having a loop shape may be provided at the convex portion to protrude in the traverse direction; when the lower flanges of the pair of UHPC side form members are arranged in parallel to contact in the traverse direction, the reinforcing bar may be located in the concave portions of the UHPC side form members adjacent to each other; a connection rod may be provided through the through hole so that the connection rod is located at a bent inside of the reinforcing bar; and when the concrete placed in the concrete placing space fills the concave portion, the reinforcing bar and the connection rod may be buried in the concrete so that the inner flanges are integrated with each other by means of the concrete as well as the reinforcing bar and the connection rod buried therein.

According to the present disclosure, since the UHPC side form member made of UHPC with high strength is not only used as a form member to manufacture a concrete girder but also configures a part of the concrete girder, it is not needed to separately install a form member to form a traverse side surface of the concrete girder, which simplifies a form fabricating process and reduces costs and time.

In addition, since the UHPC side form member made of UHPC with high strength configures a part of the concrete girder of the present disclosure, the concrete girder of the present disclosure has a great rigidity.

Moreover, UHPC has durability and an excellent resistance against contaminants. Therefore, since the UHPC side form member made of UHPC configures the traverse side surface of the concrete girder, the possibility of damage on the traverse side surface of the concrete girder is reduced.

The lower flange of the concrete girder manufactured according to the present disclosure is also mostly formed by the UHPC side form member. Since UHPC also has a very excellent strength against bearing, a great tensile force may be provided by tendons without causing a bearing failure due to the settlement of the tendons. Therefore, it is possible to manufacture a large scale concrete girder.

In addition, since a large amount of concrete may be placed between the pair of UHPC side form members in the present disclosure, a large scale concrete girder may be easily manufactured without installing an additional support member for preventing deformation of the form.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Exemplary embodiments now will be described more fully hereinafter with reference to the accompanying drawings, in which exemplary embodiments are shown.

Figure 1:
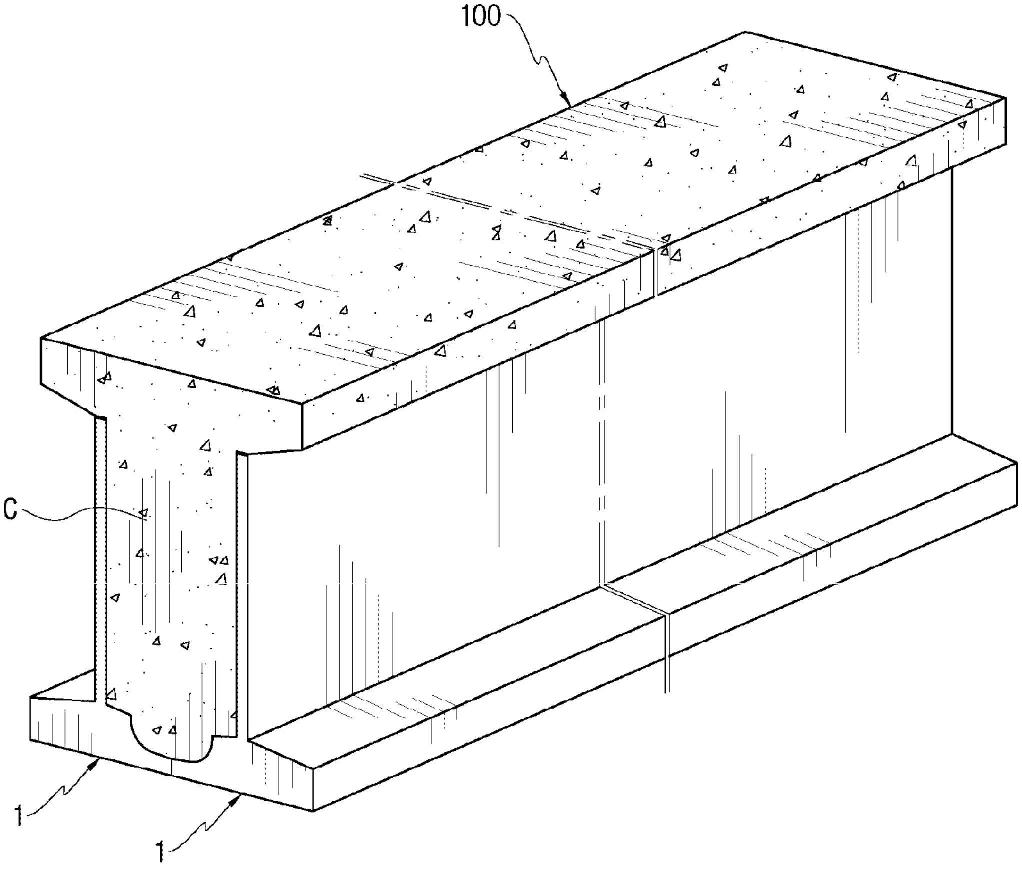
FIG. 1 is a schematic perspective view of a concrete girder according to the present disclosure, prepared by a manufacturing method of the present disclosure.
Figure 2:
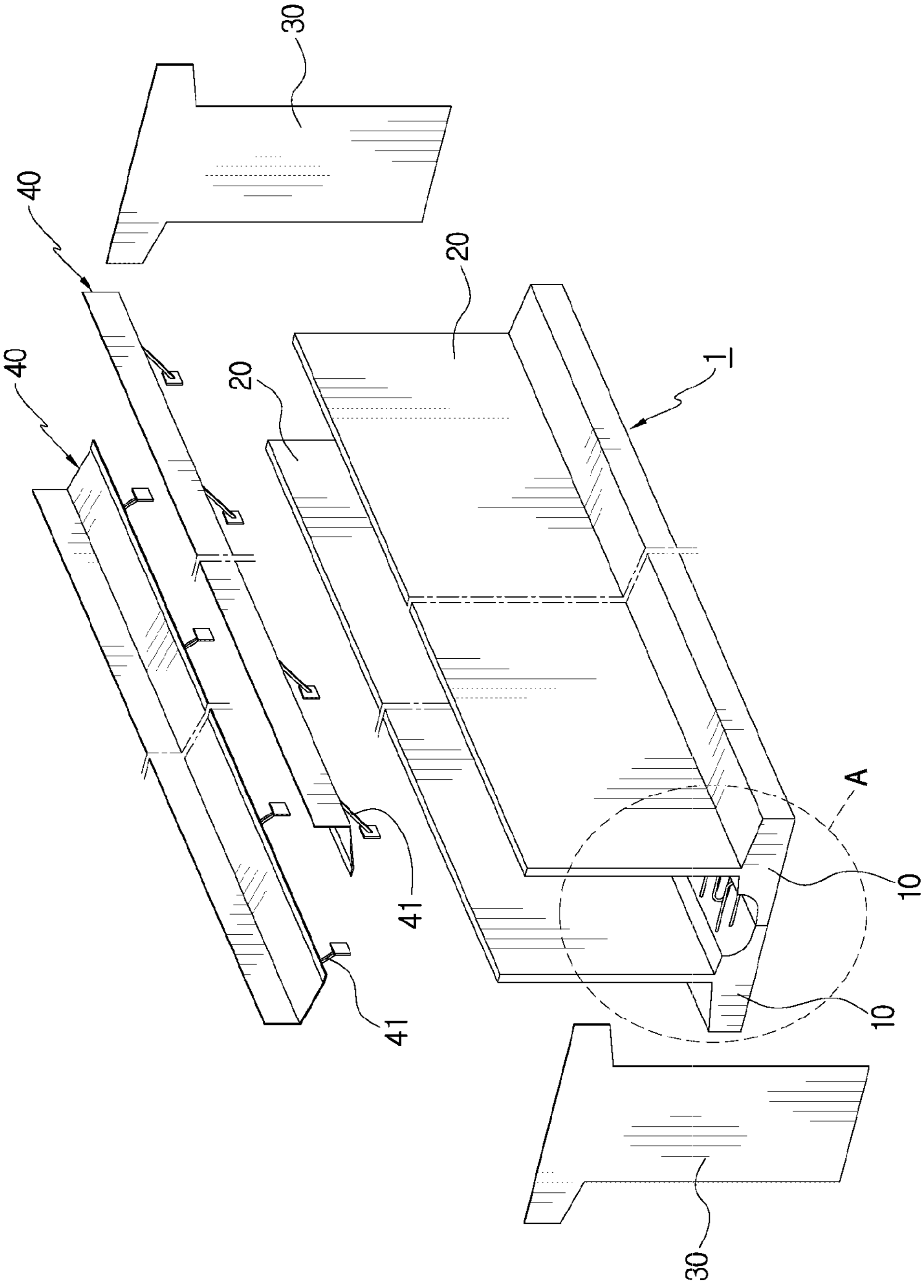
FIG. 2 is an exploded perspective view showing a UHPC side form member, an ending plate and a bent form member, which are not yet assembled, for manufacturing a concrete girder according to the manufacturing method of the present disclosure.
Figure 3:
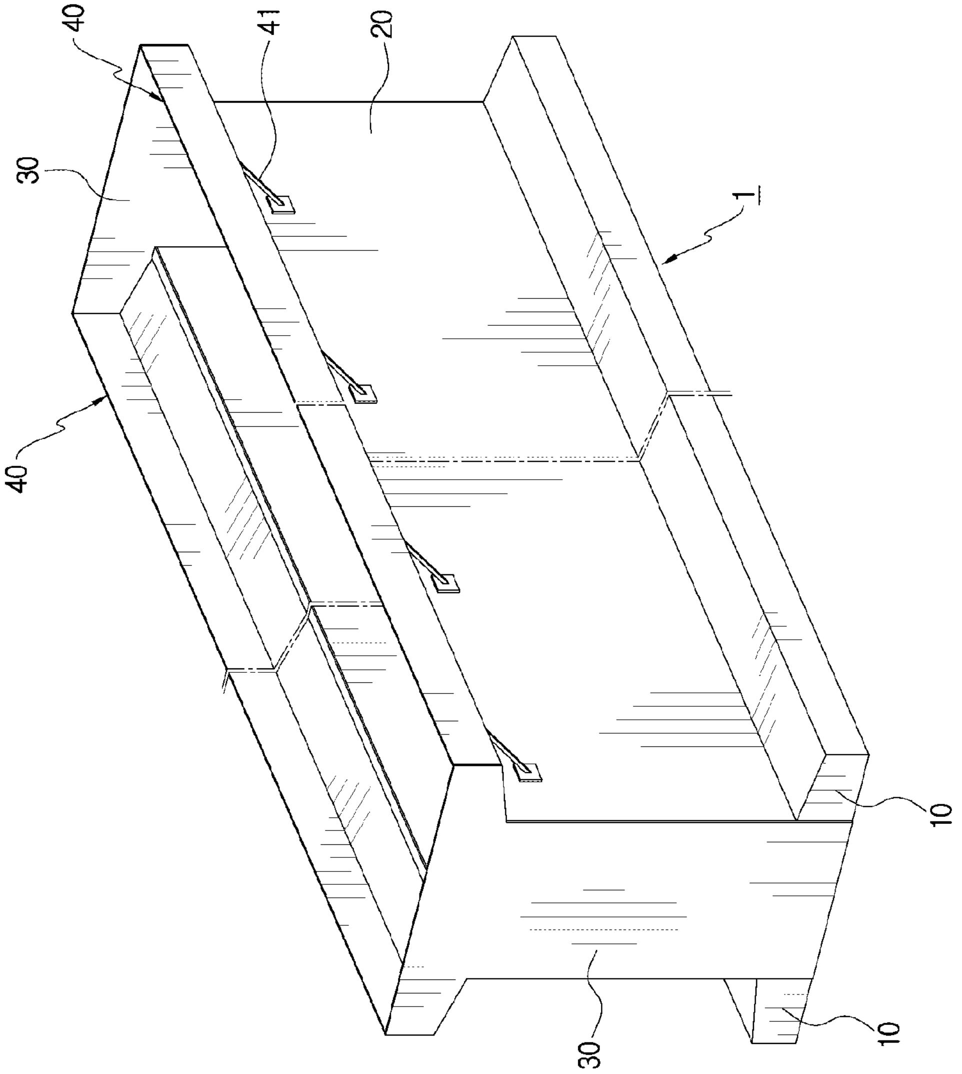
FIGS. 3 and 4 are perspective views showing the UHPC side form member, the ending plate and the bent form member, which are assembled to place concrete.
Figure 4:
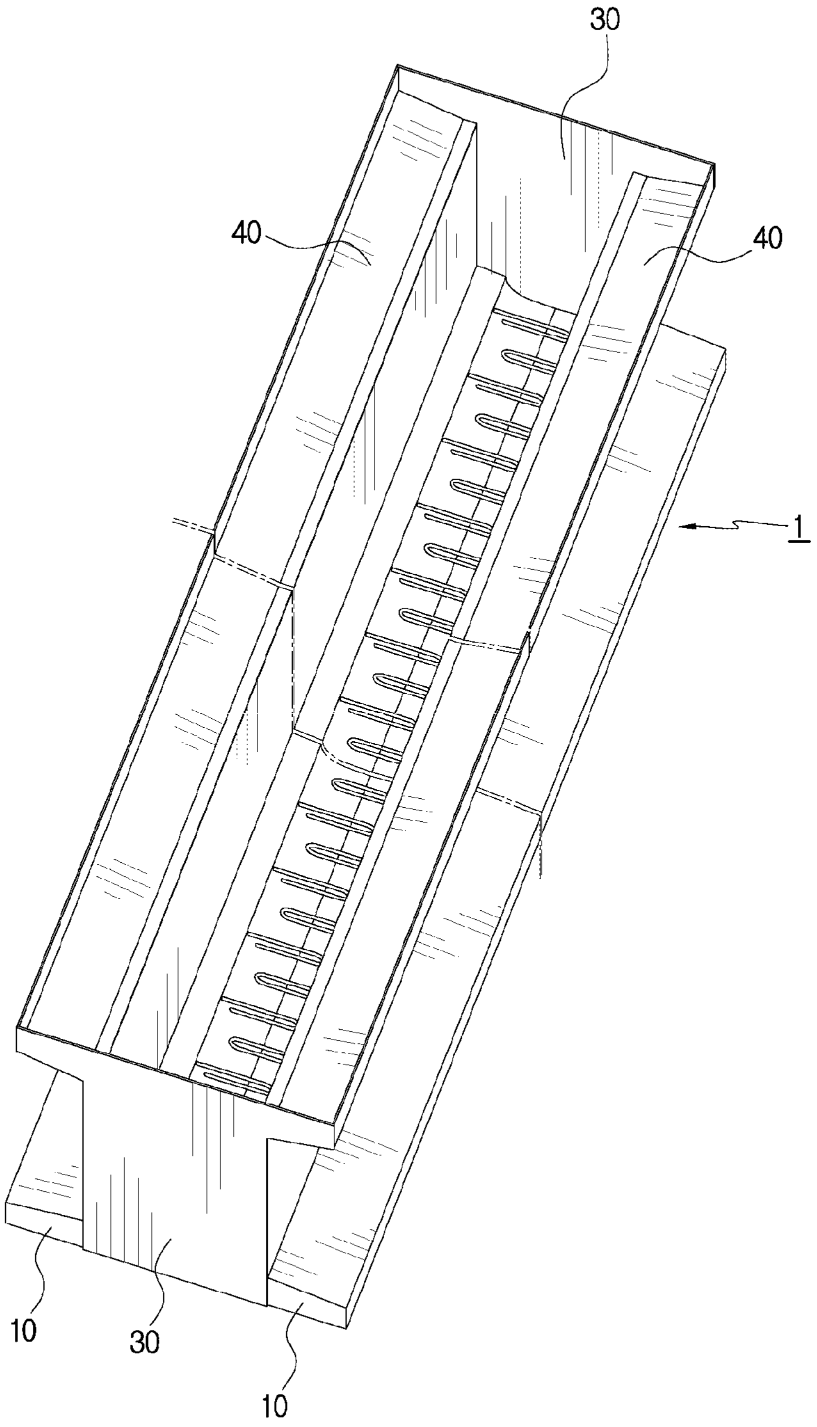
Figure 5:
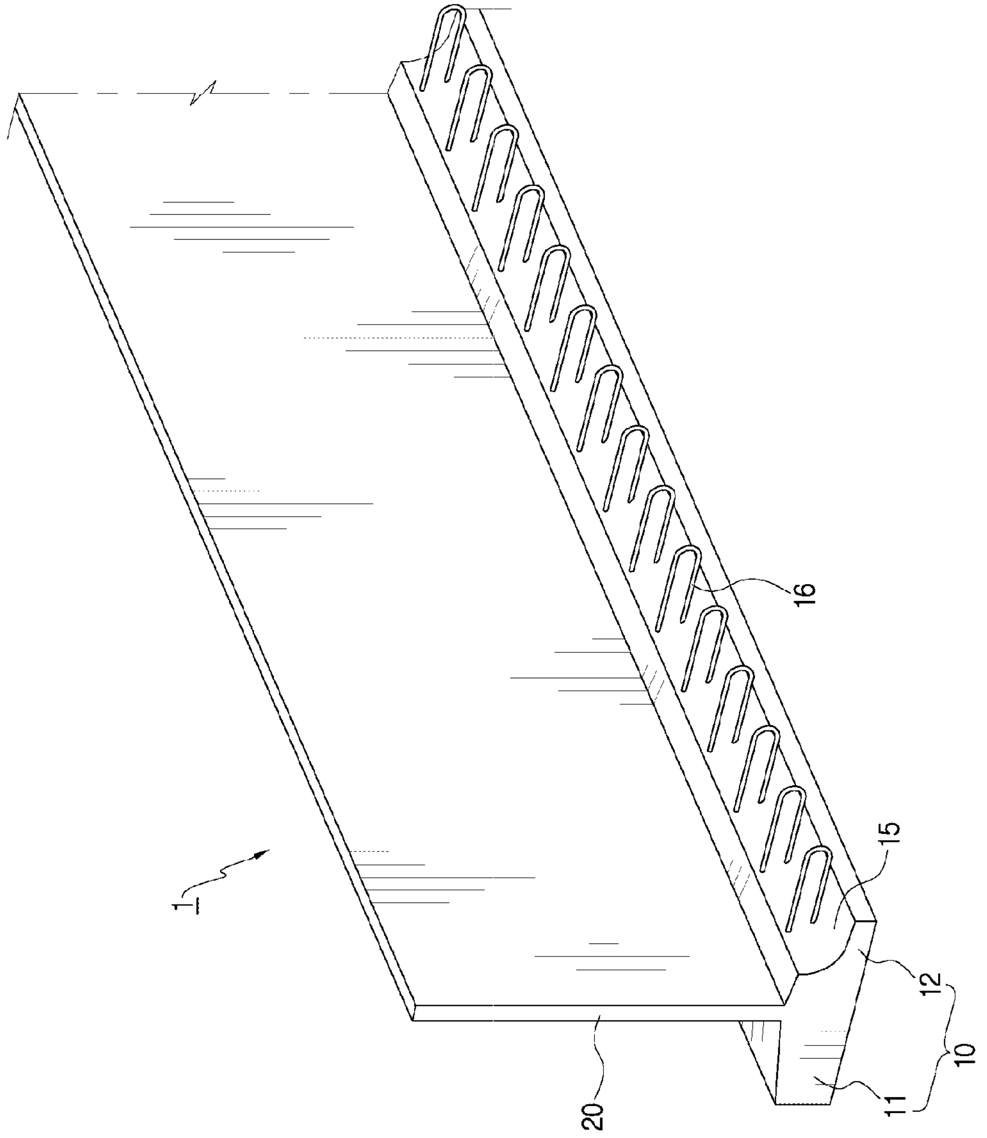
FIG. 5 is a perspective view showing the UHPC side form member, employed in the present disclosure.

FIG. 1 is a schematic perspective view of a concrete girder 100 according to the present disclosure, prepared by a manufacturing method of the present disclosure, FIG. 2 is a schematic exploded perspective view showing a state in which a UHPC side form member is disposed and before an ending plate and a bent form member are assembled, for manufacturing the concrete girder 100 according to the manufacturing method of the present disclosure, FIGS. 3 and 4 are schematic perspective views showing a state in which the UHPC side form member 1, the ending plate 30 and the bent form member 40 are assembled so that concrete may be placed, and FIG. 5 is a schematic perspective view showing only the UHPC side form member 1.

In this specification, the term “longitudinal direction” means a direction in which a concrete girder extends, and the term “traverse direction” means a direction perpendicular to the longitudinal direction on a horizontal plane.

As shown in the figures, when a concrete girder is manufactured, a pair of UHPC side form members 1 is used as a form for forming both traverse side surfaces of the concrete girder. For reference, UHPC is a concrete which includes cement, silica fume, fine aggregate, filler, water reducing agent, fiber and mixing water, does not include coarse aggregate, and has compression strength of 150 MPa or above.

An example of the UHPC side form member 1 is shown in FIG. 5 in detail. The UHPC side form member 1 includes a lower flange 10 and a web 20 perpendicular thereto and extends in the longitudinal direction. In other words, the UHPC side form member 1 has a shape like an I-type beam from which an upper flange is removed. The web 20 has a thin plate shape with a thickness of about 20 mm or less. Since the UHPC has a high strength and does not contain coarse aggregate, it is possible to make the UHPC side form member 1 with the web 20 having a thin plate shape by using the UHPC.

The lower flange 10 of the UHPC side form member 1 configures the lower flange of a concrete girder to be manufactured. When the lower flange 10 of the UHPC side form member 1 may be divided based on the web 20 into two parts in the traverse direction, the part located toward another UHPC side form member 1 adjacent thereto is called an “inner flange 12”. When the lower flange 10 of the UHPC side form member 1 may be divided based on the web 20 into two parts in the traverse direction, the part located opposite to the another UHPC side form member 1 adjacent thereto is called an “outer flange 11”. The outer flange 11 becomes a part of the lower flange of the concrete girder to be manufactured. Therefore, the outer flange 11 is sized and shaped according to design specifications of the lower flange of the concrete girder to be manufactured.

The lower flange 10 of the UHPC side form member 1 may further include a configuration for installing a tendon for longitudinal reinforcement of the concrete girder. For example, in order to dispose a longitudinal tendon at the concrete girder, if required, a sheath tube (not shown in the drawings) may be embedded in the lower flange 10 of the UHPC side form member 1 in advance. Though not shown in the figures, reinforcing bars may be provided in the lower flange 10 of the UHPC side form member 1 in advance. The UHPC side form member 1 is a precast member.

After the UHPC side form member 1 including the lower flange 10 and the web 20 is prepared in a precast manner, as shown in FIG. 2, a pair of UHPC side form members 1 is disposed in parallel so that the inner flanges 12 make contact with each other in the traverse direction. The inner flanges 12 of the pair of UHPC side form members 1 are integrated with each other in a state of contacting each other in the traverse direction, so that the inner flanges 12 of the pair of UHPC side form members 1 become a single body.

After the inner flanges 12 of the pair of UHPC side form members 1 are integrated with each other, ending plates 30 made of a steel plate, a wood plate or a synthetic resin plate are coupled to both longitudinal ends of the pair of UHPC side form members 1. Therefore, a space for placing concrete is ensured by the pair of UHPC side form members 1 and the ending plates 30 at both ends thereof. In other words, the pair of UHPC side form members 1 is disposed in parallel in the traverse direction to serve as a form member for forming a traverse side surface of the concrete girder, and the ending plates 30 are installed at both ends in the longitudinal direction to close both ends, thereby ensuring a concrete placing space having five closed surfaces for manufacturing a concrete girder.

If the concrete girder to be manufactured is a girder with an I-type section having an upper flange, a bent form plate 40 for forming the upper flange of the concrete girder may be separately prepared with steel or synthetic resin and assembled to the upper end of the web 20. In the figures, the reference symbol 41 represents a support member 41 which is temporarily installed at the web 20 of the UHPC side form member 1 to pass below the bent form plate 40.

As described above, the pair of UHPC side form members 1 and the ending plates 30 are assembled to ensure a concrete placing space for manufacturing a concrete girder, and if required, the bent form plate 40 is further installed at the upper end of the web 20. After that, reinforcing bars are installed in the concrete placing space. In other words, the longitudinal reinforcing bar and the traverse reinforcing bar for reinforcing the concrete girder are disposed in the concrete placing space. After the reinforcing bars are disposed in the concrete placing space, concrete is placed in the concrete placing space. If the concrete is completely cured, the ending plate 30 and the bent form plate 40 are removed. At this time, the pair of UHPC side form members 1 is left as they are. In other words, the pair of UHPC side form members 1 is integrated with the concrete placed in the concrete placing space, and therefore the pair of UHPC side form members 1 becomes a part of the concrete girder.

As described above, the UHPC side form member 1 not only is used as a form for manufacturing a concrete girder but also configures a part of the concrete girder. Therefore, it is not needed to install a separate form member for forming a traverse side surface of the concrete girder, which simplifies a form fabricating process and reduces costs and time. Further, since the UHPC side form member 1 made of UHPC with high strength configures a part of the concrete girder of the present disclosure, the concrete girder of the present disclosure has a great strength. In addition, UHPC has durability and an excellent resistance against contaminants. Therefore, since the UHPC side form member 1 made of UHPC configures a part of the traverse side surface of the concrete girder, the possibility of damage on the traverse side surface of the concrete girder is reduced.

In particular, the lower flange of the concrete girder manufactured according to the present disclosure is also mostly formed by the pair of UHPC side form members 1. Since UHPC also has a very excellent strength against bearing, a great tensile force may be provided by tendons without causing a bearing failure due to the settlement of the tendons. Therefore, it is possible to manufacture a large scale concrete girder. In other words, a larger concrete girder may be manufactured.

The web 20 of the UHPC side form member 1 has a great strength in spite of a small thickness. Therefore, even though a large amount of concrete is placed between the pair of UHPC side form members 1 to give a great placing pressure to the web 20, the web 20 may maintain its original shape without being deformed. Since a large amount of concrete may be placed between the pair of UHPC side form members 1 as described above, a large scale concrete girder which needs to place a large amount of concrete may be easily manufactured without installing an additional support member for preventing deformation of the form.

Figure 6:
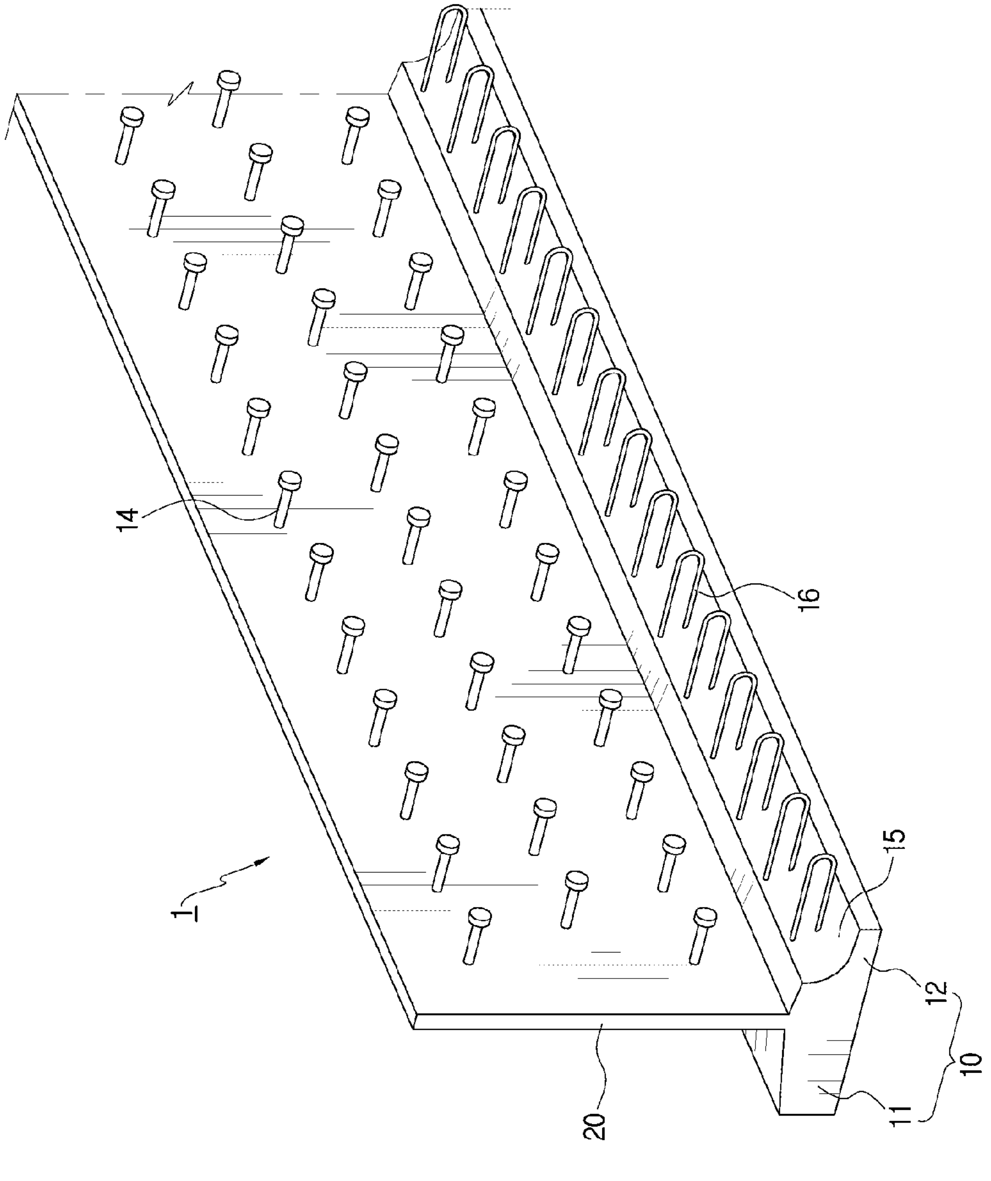
FIG. 6 is a schematic perspective view of a UHPC side form member according to an embodiment of the present disclosure, at which an embedded connector is installed.

In order to allow the concrete in the concrete placing space to be integrated with the UHPC side form member 1 more firmly, an embedded connector 14 such as a stud may be installed at the inside of the UHPC side form member 1 in advance. FIG. 6 is a schematic perspective view showing a UHPC side form member according to an embodiment in which the embedded connector 14 is installed. As shown in FIG. 6, the UHPC side form member 1 may be prepared in a state where the embedded connector 14 such as a stud or a bolt may be installed at the inside of the web 20. If the embedded connector 14 is provided in advance, the concrete filled in the concrete placing space may be integrated with the UHPC side form member 1 more firmly. For integration between the concrete and the UHPC side form member 1, the inside of the UHPC side form member 1 may be prepared to have a coarse surface, in addition to the embedded connector 14 or instead of the embedded connector 14.

For the integration of the lower flanges 10 of the pair of UHPC side form members 1 arranged in parallel in the traverse direction, the present disclosure may have the following configuration.

Figure 7:
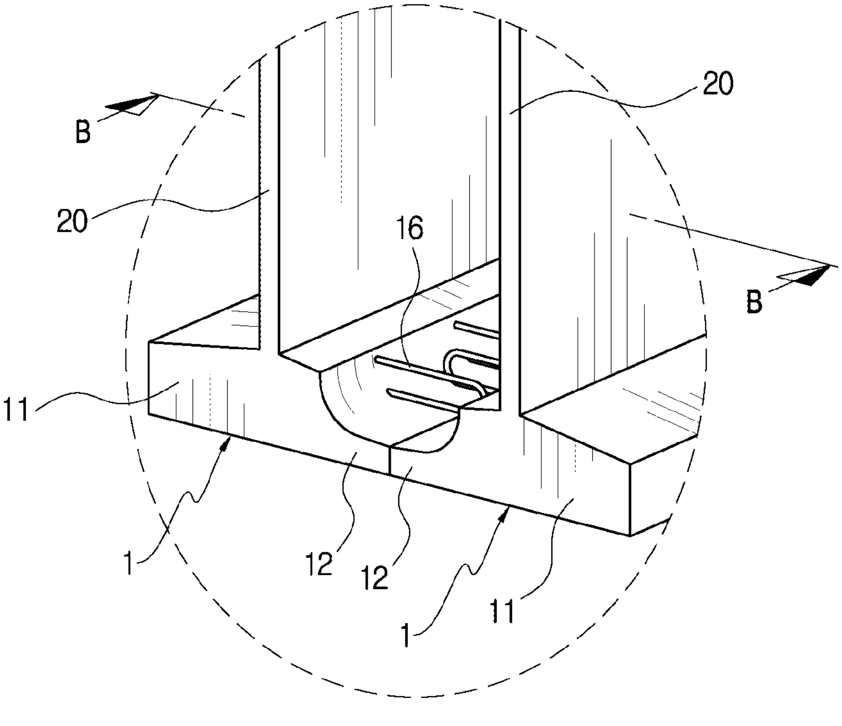
FIG. 7 is a schematic enlarged perspective view showing the circular A portion of FIG. 2.
Figure 8:
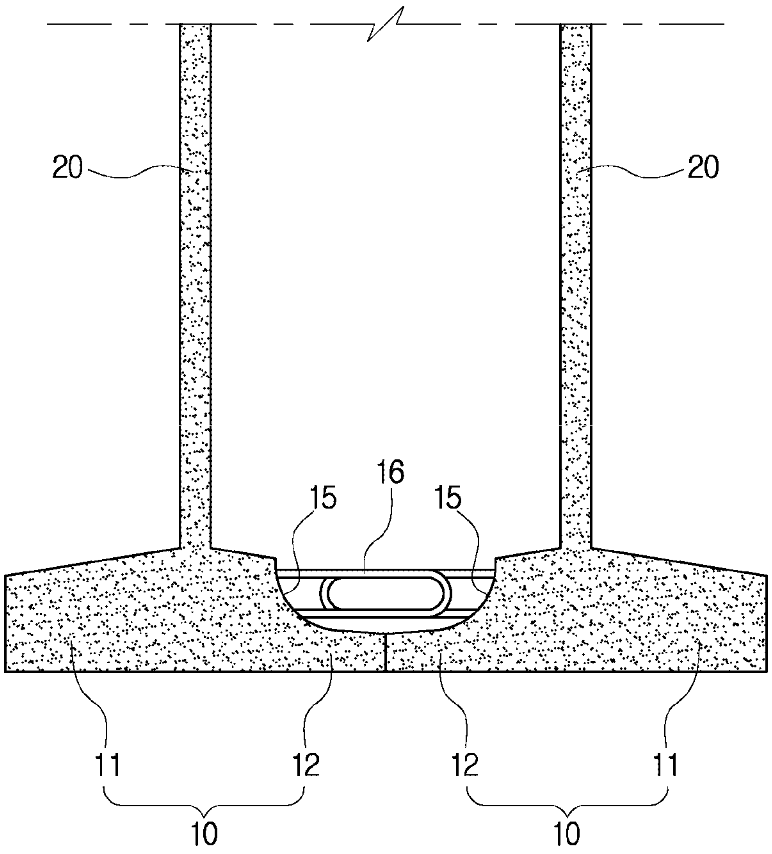
FIGS. 8 and 9 are schematic longitudinal sectional views, taken along the line B-B of FIG. 7.
Figure 9:
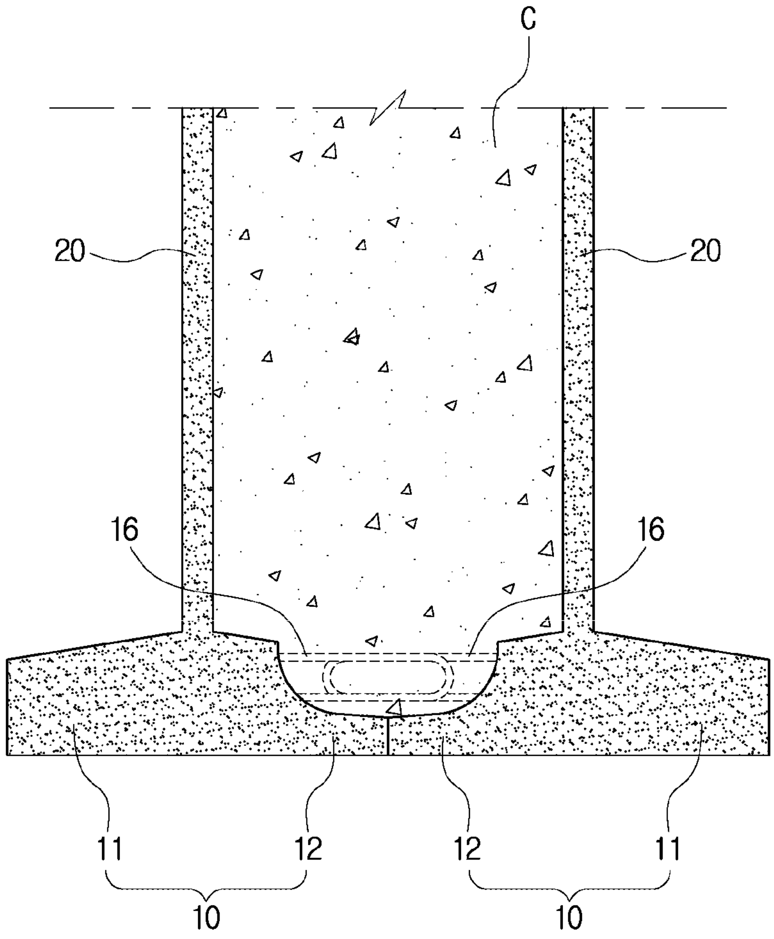

FIG. 7 is a schematic enlarged perspective view showing the circular A portion of FIG. 2, and FIGS. 8 and 9 are schematic longitudinal sectional views, taken along the ling B-B of FIG. 7. Here, FIG. 8 shows a state before concrete C is placed, and FIG. 9 shows a state in which the concrete C is placed. In FIGS. 7 to 9, the inside of the concrete girder, namely reinforcing bars buried in the concrete C, tendons disposed at the lower flange 10 or the like are not shown for convenience.

A concave portion 15 is formed in the upper end of the end portion of the inner flange 12 of the UHPC side form member 1 to extend in the longitudinal direction. A reinforcing bar 16 protruding in the traverse direction is provided at the concave portion 15. When the inner flanges 12 of the pair of UHPC side form members 1 are arranged in parallel to contact each other, the reinforcing bars 16 overlap each other. In a state where the reinforcing bars 16 overlap, if concrete is placed in the concrete placing space, while the concrete fills the concave portion 15, the reinforcing bars 16 are buried in the concrete. Therefore, the inner flanges 12 of the pair of UHPC side form members 1 adjacent to each other are integrated with each other by means of the concrete and the reinforcing bar 16 buried therein. In other words, the lower flanges 10 of the pair of UHPC side form members 1 are integrated with each other. And, the concrete placed in the concrete placing space is also integrated with the lower flanges 10 of the pair of UHPC side form members 1.

Even though FIGS. 2 to 9 depict that the reinforcing bar 16 protruding in the traverse direction from the inner flange 12 is a "loop reinforcing bar" having a loop shape, in the present disclosure, the reinforcing bar 16 is not limited such a loop reinforcing bar. The reinforcing bar 16 may have a linear shape or various other shapes. Further, when describing the shape of the reinforcing bar 16, the term "loop shape" means not only that the loop is perfectly closed but also that the loop has a partial open portion without being entirely closed.

Figure 10:
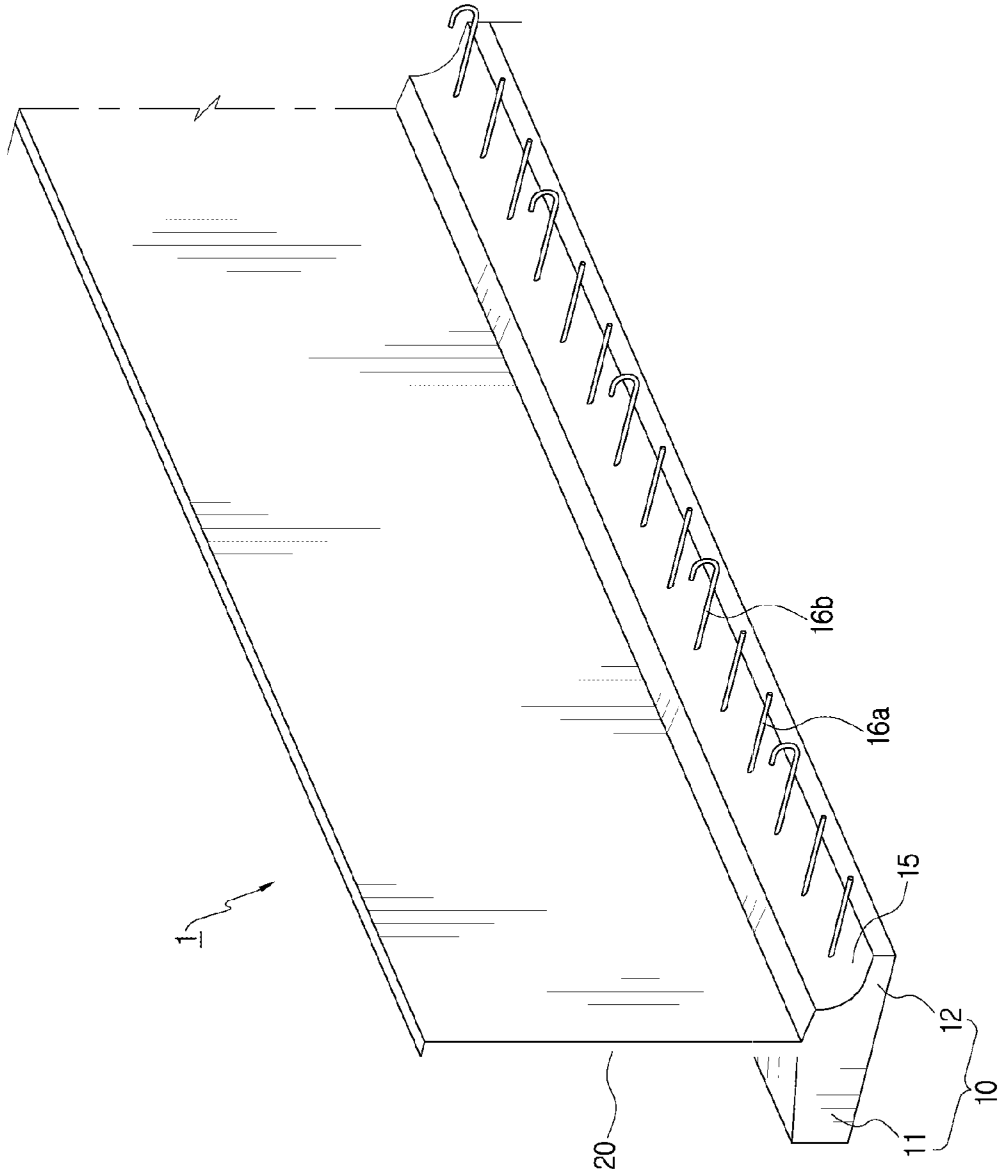
FIGS. 10 and 11 are perspective views showing a UHPC side form member according to an embodiment in which a straight reinforcing bar protrudes on a lower flange, respectively in states before and after being assembled.
Figure 11:
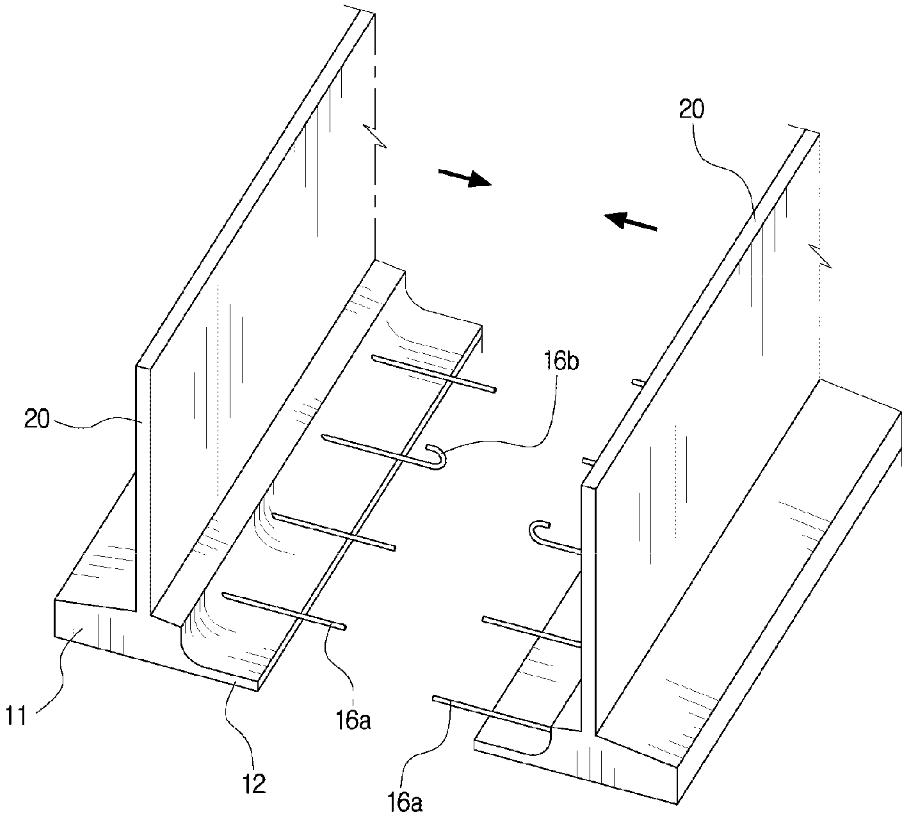

FIG. 10 is a schematic perspective view showing a UHPC side form member 1 according to an embodiment in which a straight reinforcing bar and an unclosed loop reinforcing bar protrude from the inner flange 12 in the traverse direction. FIG. 11 is a schematic perspective view showing a state in which a pair of UHPC side form members 1 depicted in FIG. 10 is approaching each other to be arranged adjacent to each other in the traverse direction. In relation to FIGS. 10 and 11, a reference symbol 16*a* is endowed to the straight reinforcing bar, and a reference symbol 16*b* is endowed to the unclosed loop reinforcing bar, for convenience.

As shown in FIGS. 10 and 11, the reinforcing bar protruding from the inner flange 12 in the traverse direction may be configured with as a straight reinforcing bar 16*a*. In addition, the reinforcing bar protruding from the inner flange 12 in the traverse direction may be configured as an unclosed loop reinforcing bar 16*b* having an unclosed loop shape which is not perfectly closed but bent to have a partial open portion. The straight reinforcing bar 16*a*, the reinforcing bar 16*b* having an unclosed loop shape, and the reinforcing bar having a closed loop shape described above may be used in mixture or solely.

Even though FIGS. 2 to 9 show that the reinforcing bar 16 protrudes from the concave portion 15, in the present disclosure, the reinforcing bar 16 may not protrude from the concave portion 15.

Meanwhile, as described in the embodiment depicted in FIGS. 2 to 9, if the lower flanges 10 of the UHPC side form members 1 are integrated by using the phenomenon that the reinforcing bars 16 having a loop shape overlap each other, the lower flanges 10 may be integrated more firmly by using the following configuration, and the concrete at the center portion of the concrete girder may also be integrated more firmly with the UHPC side form members 1.

Figure 12:
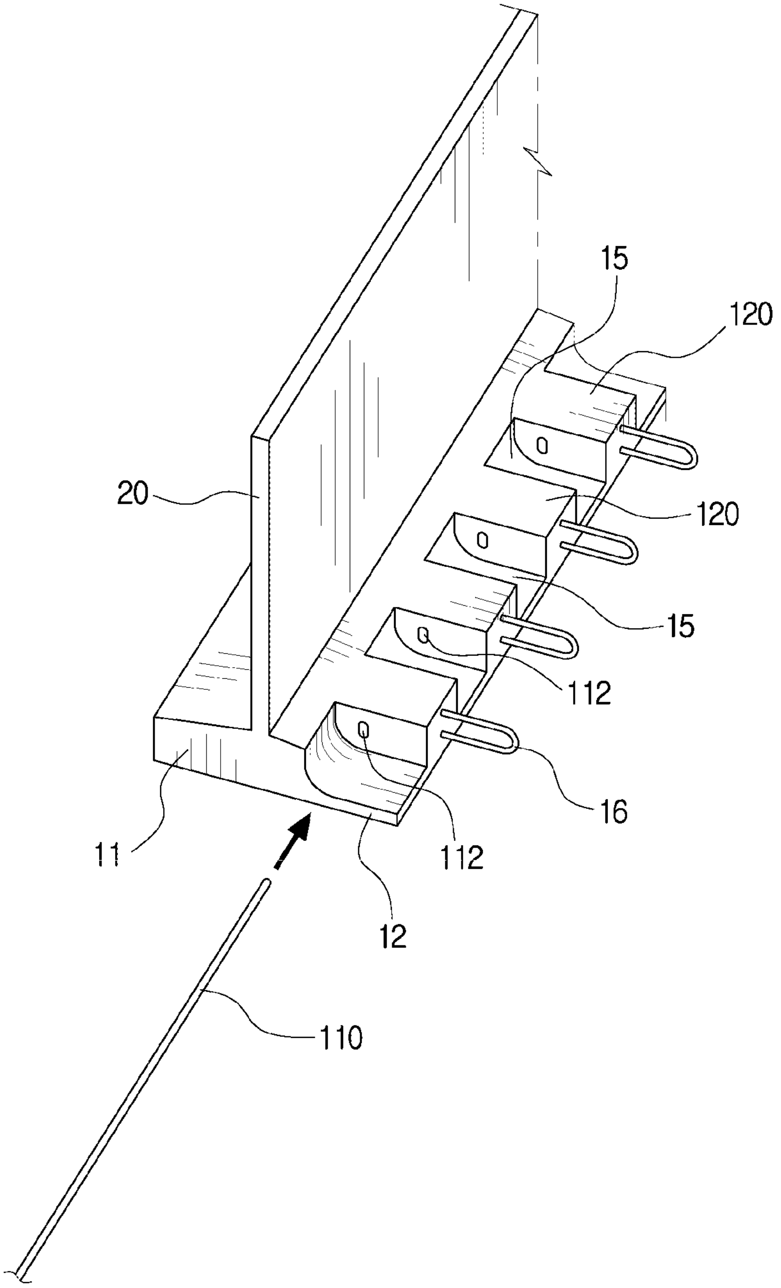
FIGS. 12 and 13 are perspective views showing a UHPC side form member according to an embodiment in which lower flanges are coupled using a steel rod and a reinforcing bar, respectively.
Figure 13:
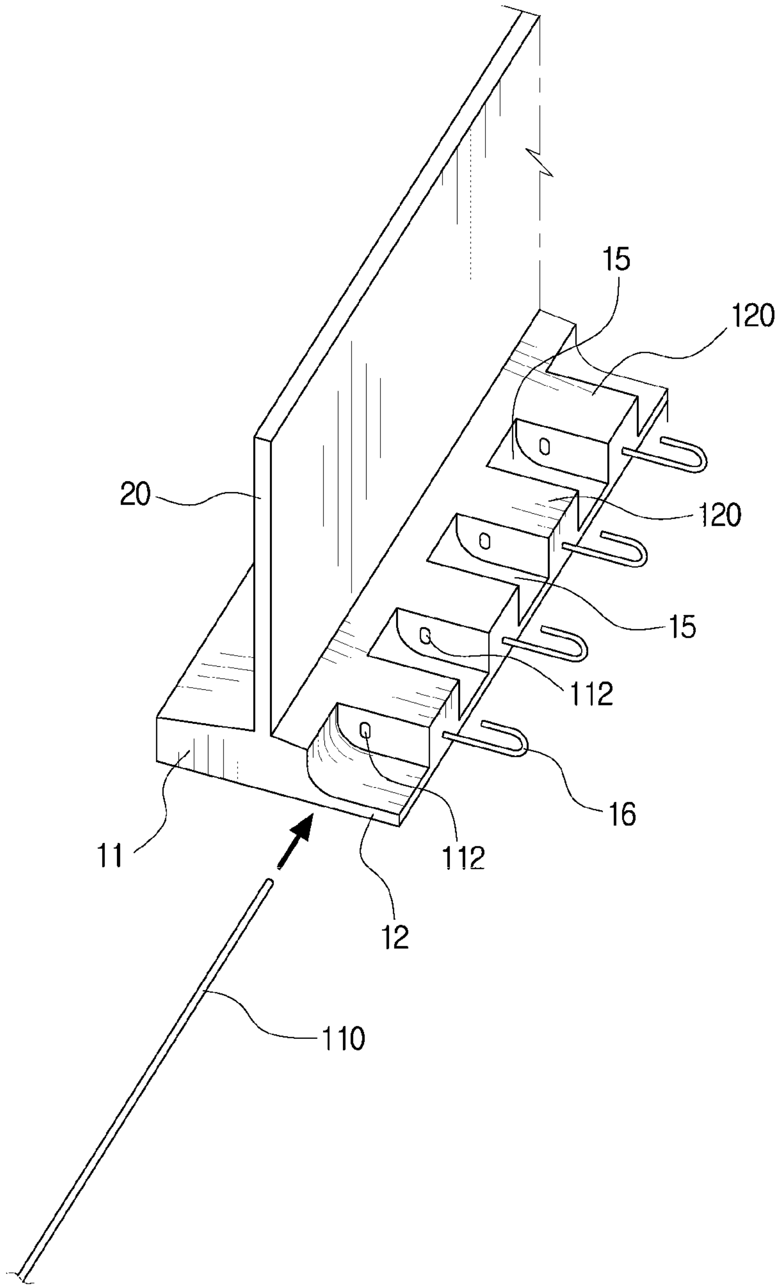
Figure 14:
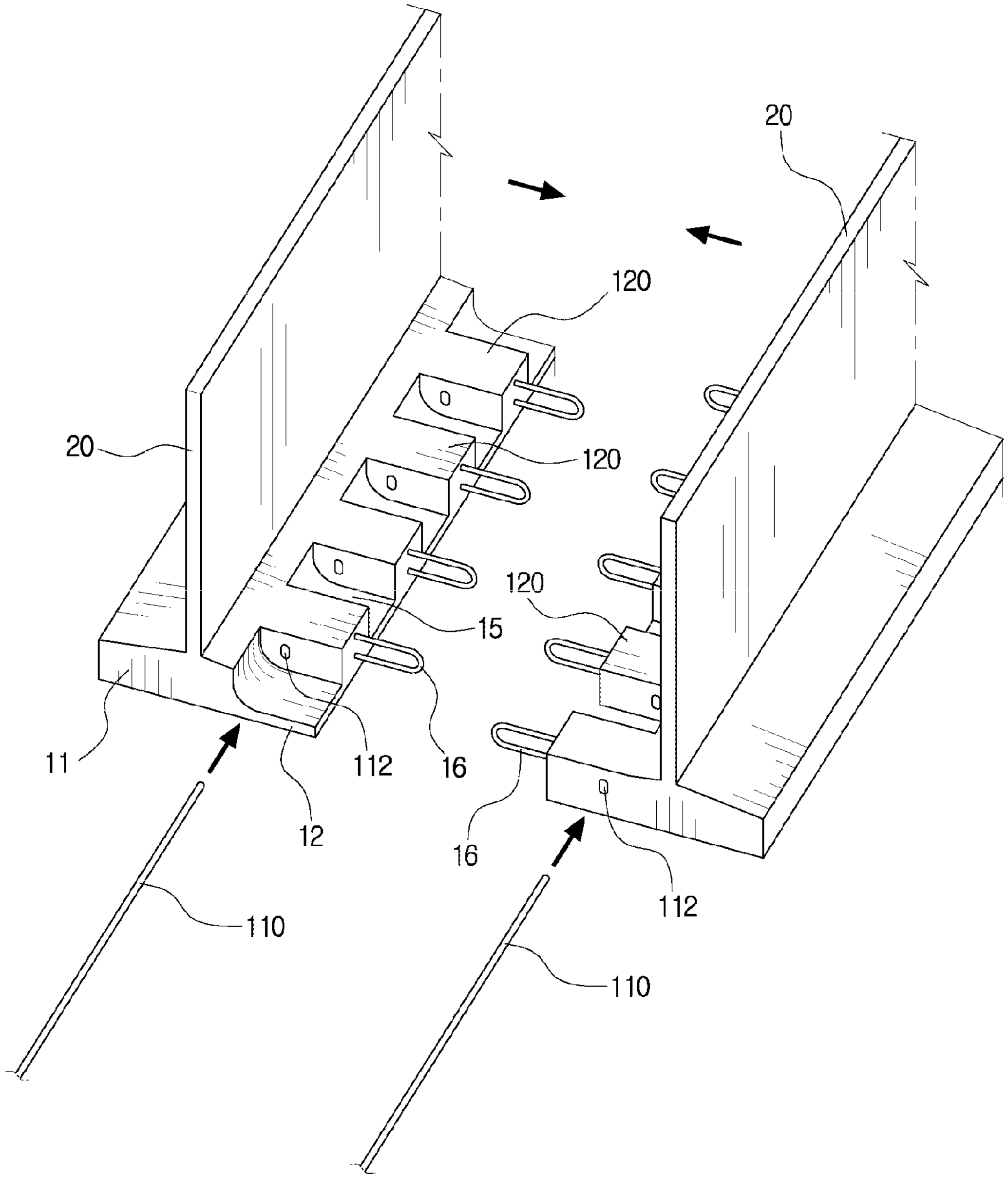
FIG. 14 is a perspective view showing a pair of UHPC side form members, depicted in FIG. 12, which are approaching each other.
Figure 15:
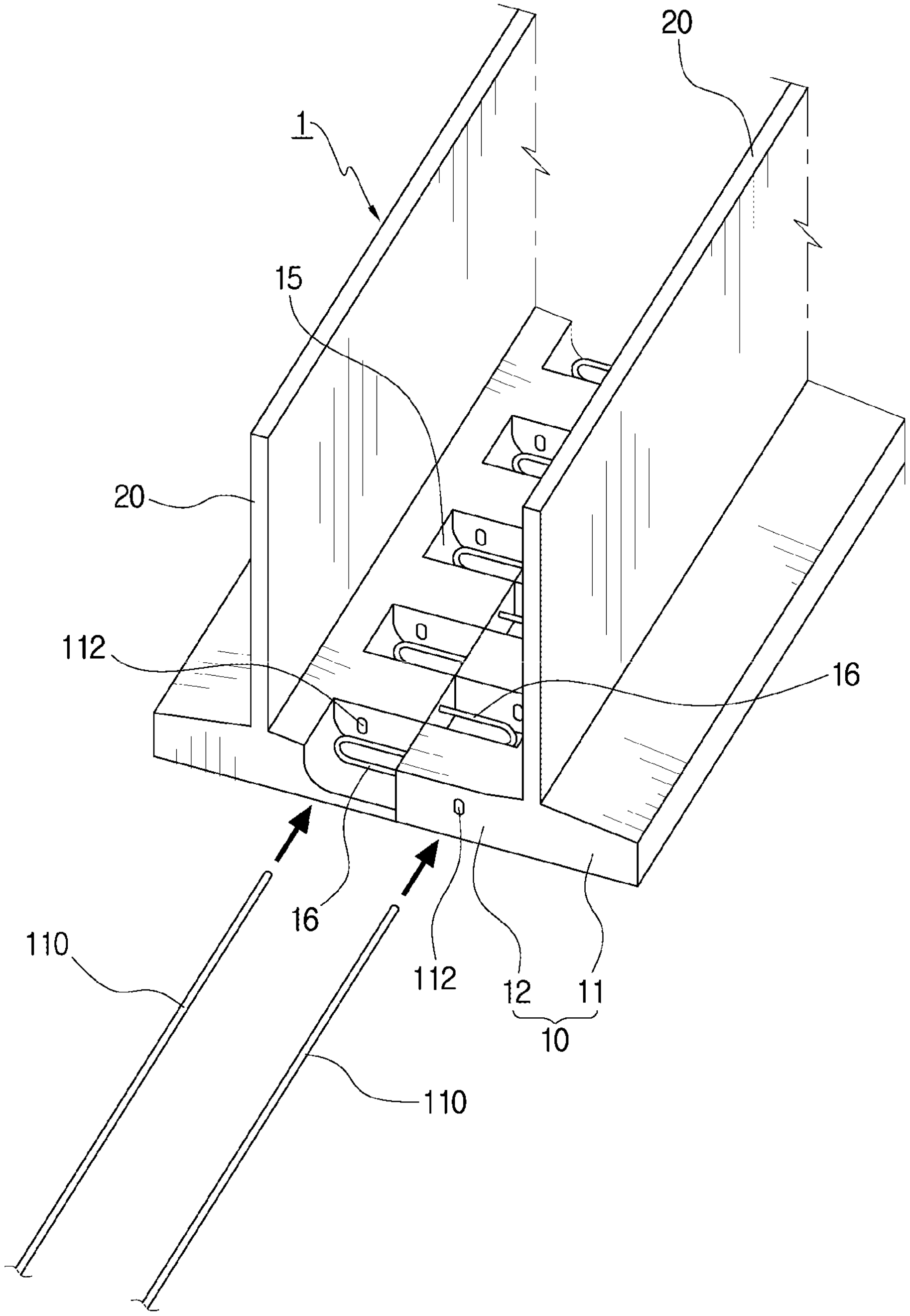
FIG. 15 is a perspective view showing a state in which lower flanges are closely adhered and before a steel rod is inserted therein, followed by the state of FIG. 14.
Figure 16:
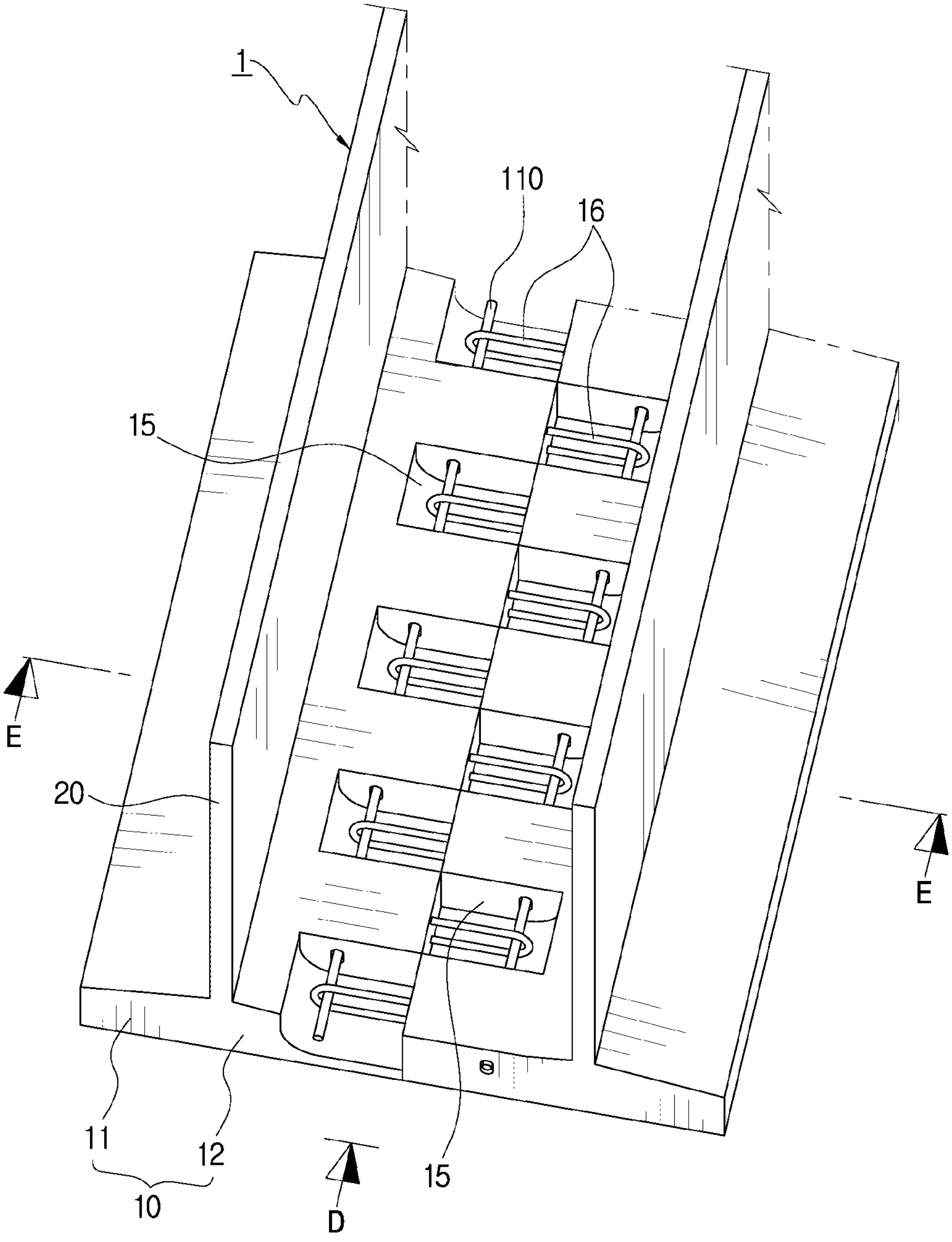
FIG. 16 is a perspective view showing a state after the steel rod is inserted, followed by the state of FIG. 15.
Figure 17:
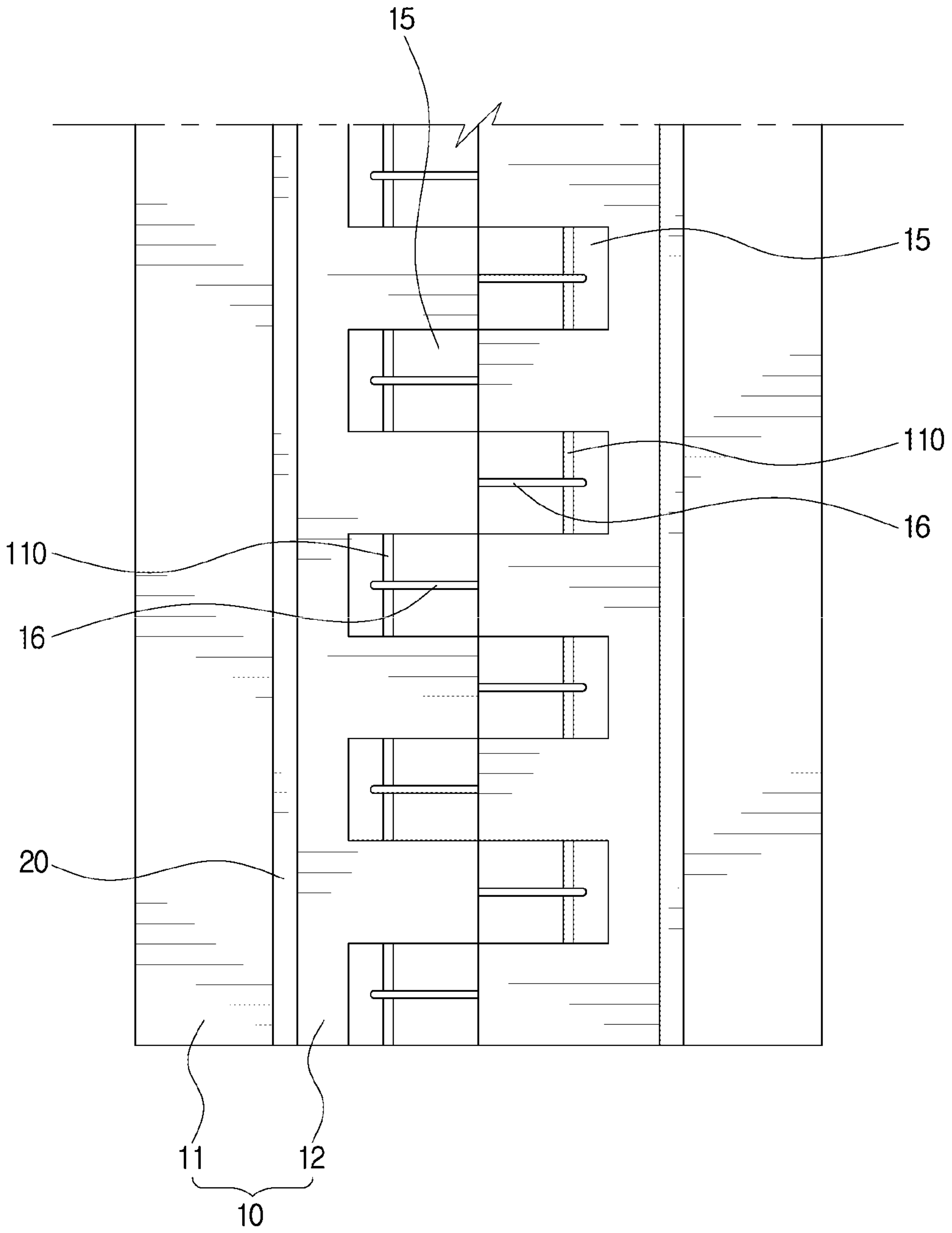
FIG. 17 is a plane view showing the state of FIG. 16, observed from the above.
Figure 18:
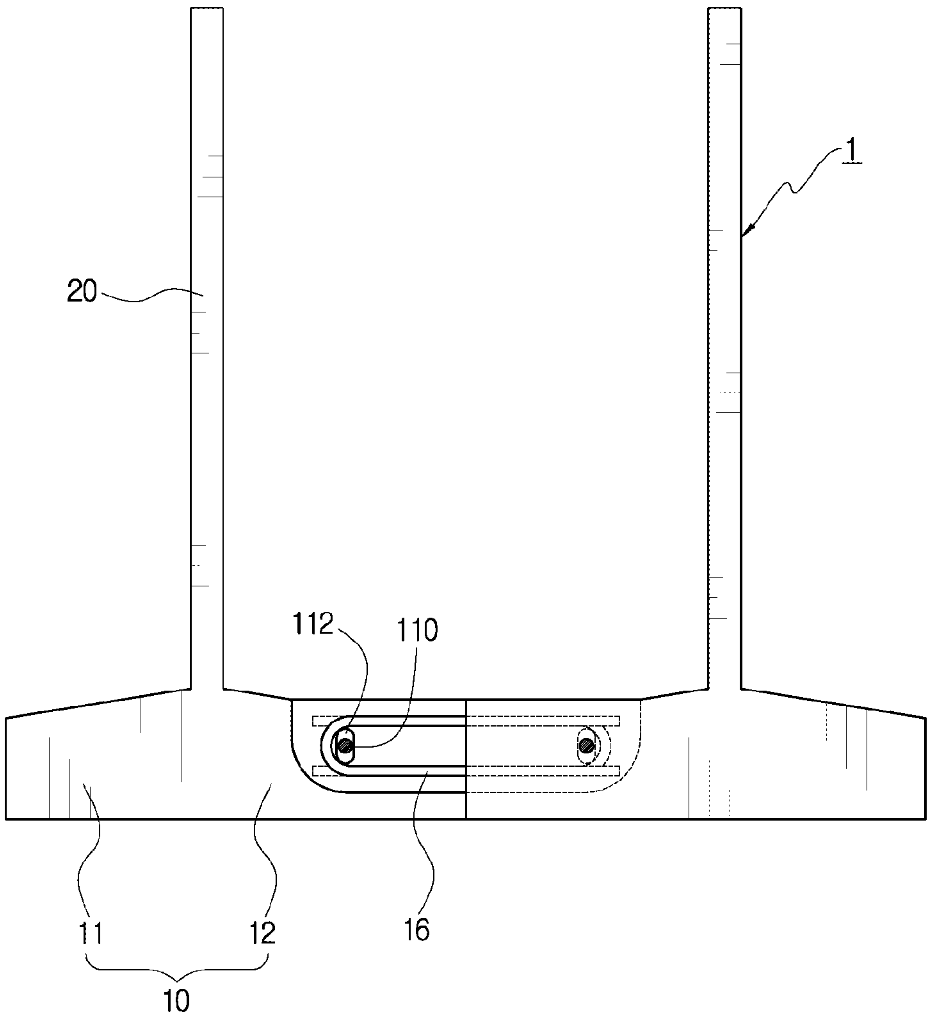
FIG. 18 is a schematic view showing the state of FIG. 16, observed along the arrowed direction D.
Figure 19:
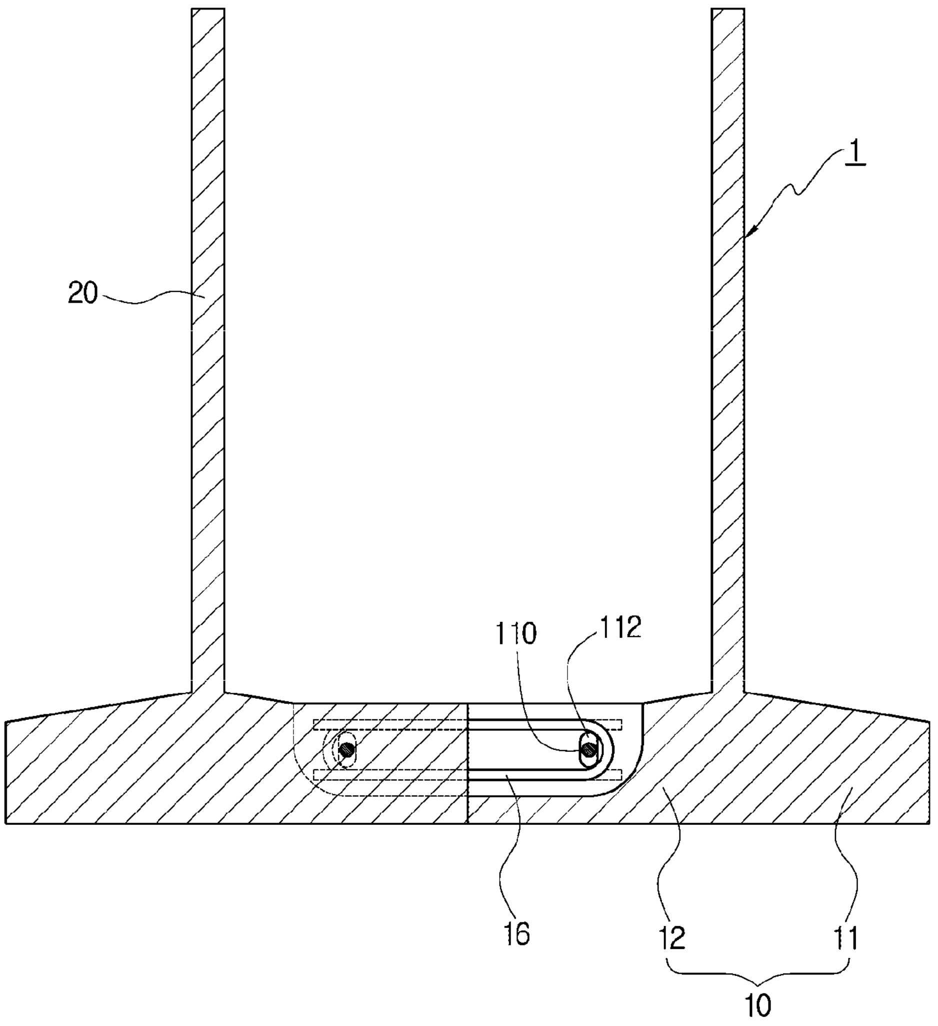
FIG. 19 is a longitudinal sectional view, taken along the line E-E of FIG. 16.

FIGS. 12 and 13 are schematic perspective views showing a UHPC side form member 1 according to an embodiment in which lower flanges are coupled using a steel rod 110 and a reinforcing bar 16, respectively. FIG. 12 is directed to a case in which the reinforcing bar 16 has a perfectly closed loop shape, and FIG. 13 is directed to a case in which the reinforcing bar 16 has an unclosed loop shape. FIG. 14 is a schematic perspective view showing a pair of UHPC side form members 1, depicted in FIG. 12, which are approaching each other to be arranged adjacent to each other in the traverse direction. FIG. 15 is a schematic perspective view showing a state in which lower flanges are closely adhered and before the steel rod 110 is inserted therein, followed by the state of FIG. 14. FIG. 16 is a schematic perspective view showing a state after the steel rod 110 is inserted, followed by the state of FIG. 15. FIG. 17 is a schematic plane view showing the state of FIG. 16, observed from the above. FIG. 18 is a schematic view showing the state of FIG. 16, observed along the arrowed direction D (in the longitudinal direction). FIG. 19 is a schematic sectional view, taken along the line E-E of FIG. 16.

In the embodiment depicted in FIGS. 12 to 19, concave portions 15 are formed at an upper edge of an outer side end of the inner flange 12 of the UHPC side form member 1 with an interval in the longitudinal direction. In other words, since the upper edge is removed from the outer end of the inner flange 12 of the UHPC side form member 1, the concave portions 15 are formed so that the inner flange 12 just has a predetermined reduced thickness, and such concave portions 15 are formed sparsely with an interval in the longitudinal direction. Since the concave portions 15 are formed with an interval in the longitudinal direction, convex portions 120 formed with the upper edge at the outer side end of the inner flange 12 are resultantly present between the concave portions 15 with an interval in the longitudinal direction. In other words, the concave portions 15 and the convex portions 120 are present in turns in the longitudinal direction.

At the traverse side surfaces of the convex portion 120, namely at the side surface of the inner flanges 12 of UHPC side form members 1 adjacent to each other, the reinforcing bar 16 is provided to protrude from the convex portion 120. In other words, the body of the reinforcing bar 16 is embedded in the inner flange 12 by means of the convex portion 120, and only the portion having a loop shape protrudes from the convex portion 120. In this specification, the "loop shape" of the reinforcing bar 16 means not only a perfectly closed loop but also an unclosed loop which has a partial open portion to be bent inwards.

A through hole 112 is formed in the convex portion 120 in the longitudinal direction, and a connection rod 110 is disposed through the through hole 112 in the longitudinal direction of the concrete girder. In other words, the through hole 112 is formed in each convex portion 120 in the longitudinal direction, and the connection rod 110 is disposed in the longitudinal direction to pass through the through holes 112 of a plurality of convex portions 120. For allowing the connection rod 110 to be easily inserted, the through hole 112 may be an elongated hole.

If the pair of UHPC side form members 1 are arranged in parallel to be adjacent to each other so that the outer side ends of the inner flanges 12 make contact with each other, the concave portion 15 formed at the inner flange 12 of one UHPC side form member is dislocated from the concave portion 15 formed at the inner flange 12 of the other UHPC side form member 1. In other words, when the inner flanges 12 of the UHPC side form members adjacent to each other make contact with each other to face each other, the concave portions 15 are formed to be dislocated. Therefore, if the inner flanges 12 of the UHPC side form members 1 are disposed to face each other in contact, the open portion of the concave portion 15 formed at the inner flange 12 of one UHPC side form member faces the convex portion 120 formed at the inner flange 12 of the other UHPC side form member, and the open portion of the concave portion 15 formed at the inner flange 12 of the other UHPC side form member faces the convex portion 120 formed at the inner flange 12 of one UHPC side form member.

Therefore, as shown in FIG. 15, the reinforcing bar 16 protruding from the convex portion 120 formed at the inner flange 12 of one UHPC side form member is positioned in the concave portion 15 of the other UHPC side form member, and the reinforcing bar 16 protruding from the convex portion 120 of the other UHPC side form member is located in the concave portion 15 of one UHPC side form member. Subsequently, as shown in FIGS. 16 to 19, the connection rod 110 is inserted through the through hole 112 formed in the convex portion 120 of each UHPC side form member 1 and disposed in the longitudinal direction. The connection rod 110 inserted through the through hole 112 protrudes from a UHPC side form member 1 adjacent thereto and located at a bent inside of the reinforcing bar 16 located in the concave portion. In other words, the connection rod 110 provided through the convex portion 120 of one UHPC side form member passes through the bent inside of the reinforcing bar 16 having a closed or unclosed loop shape, which protrudes from the other UHPC side form member and is located at the concave portion 15 of one UHPC side form member. The connection rod 110 provided through the convex portion 120 formed at the other UHPC side form member is located at the inside of the reinforcing bar 16 protruding from one UHPC side form member on the contrary.

Figure 20:
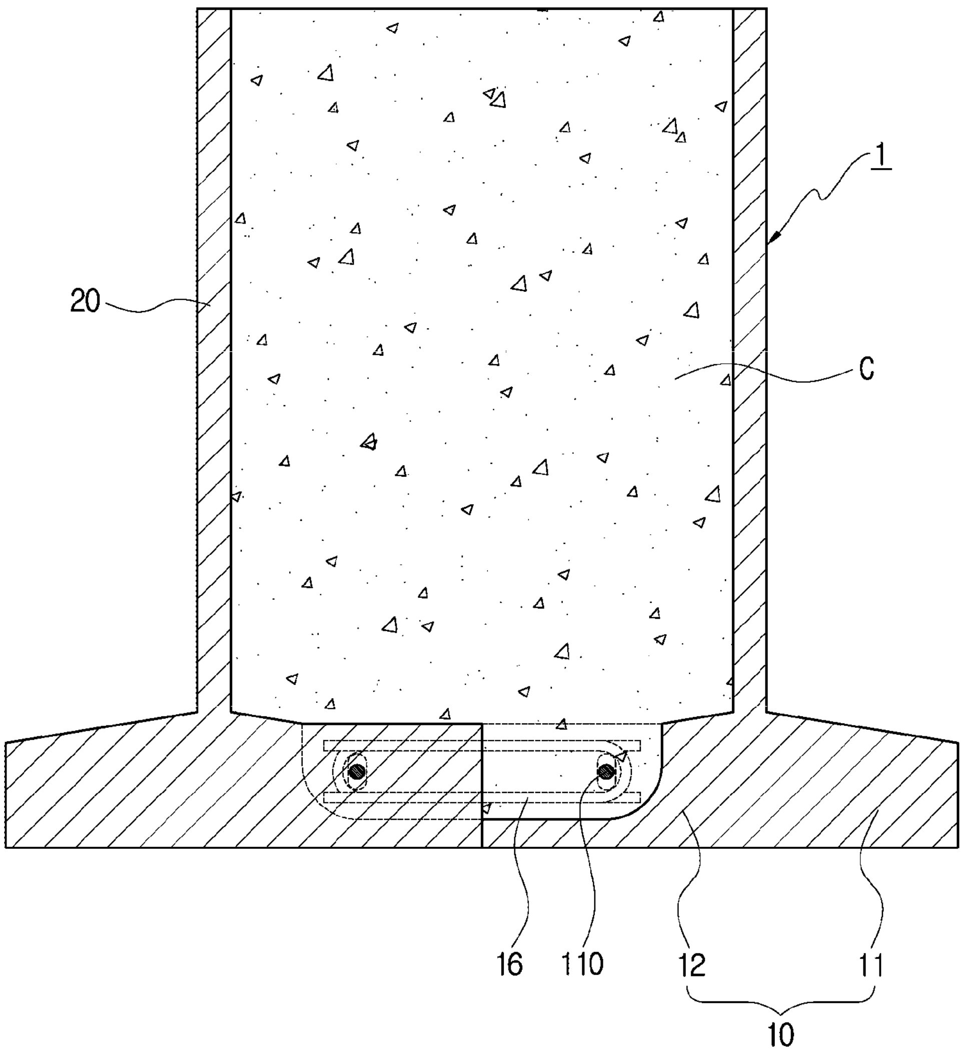
FIG. 20 is a longitudinal sectional view showing a state in which concrete is placed in a concrete placing space between a pair of UHPC side form members, followed by the state of FIG. 19.

FIG. 20 is a schematic longitudinal sectional view showing a state in which concrete C is placed in the concrete placing space between the pair of UHPC side form members, followed by the state of FIG. 19. As shown in FIG. 20, if concrete is placed in the concrete placing space, the concrete also fills the concave portion 15, and the connection rod 110 provided in the concave portion 15 to pass through the reinforcing bar 16 is buried in the concrete C and cured. Accordingly, the inner flanges 12 adjacent to each other are integrated more firmly. In a configuration in which the lower flanges 10 of the pair of UHPC side form members 1 are integrated as described above, a force is transferred as follows.

A force applied to one UHPC side form member is transferred through the reinforcing bar 16 to the concrete filled in the concave portion 15 of the other UHPC side form member and the connection rod 110 provided through the reinforcing bar 16. However, the connection rod 110 is not simply disposed in the concrete C, but passes through the convex portion 120 of the other UHPC side form member. Therefore, the force transferred through the reinforcing bar 16 of one UHPC side form member to the connection rod 110 coupled to the other UHPC side form member is transferred again through the connection rod 110 to the other UHPC side form member. In other words, in the present disclosure, the force from one UHPC side form member is transferred to UHPC side form member not only through the concrete C but also directly transferred to the other UHPC side form member through the connection rod 110 provided through the other UHPC side form member and the reinforcing bar 16 of one UHPC side form member located in the connection rod 110. Therefore, in the present disclosure, the force between UHPC side form members adjacent to each other is more easily and directly transferred to each other, and the pair of UHPC side form members 1 is integrated more firmly. When manufacturing a concrete girder by using the UHPC side form member of FIGS. 13 to 20, similar to the embodiment of FIGS. 2 to 9 described above, the bent form member 40, the ending plate 30 or the like are assembled to ensure a concrete placing space, and then concrete is placed therein. Therefore, repeated descriptions or figures which are already illustrated in FIGS. 2 to 9 are omitted.

Since concrete C is placed in a state in which a pair of UHPC side form members 1 is integrated more firmly, a concrete girder may be manufactured so that the pair of UHPC side form members 1 configures a part thereof, and therefore a large scale concrete girder may be easily manufactured. In particular, since the pair of UHPC side form members 1 are integrated very firmly by means of an inherent coupling structure of the present disclosure using the reinforcing bar 16, the connection rod 110 or the like as described above, when a concrete girder is finally produced, a strong binding force is applied between the pair of UHPC side form members 1 in the traverse direction. Therefore, the rigidity of the concrete girder, such as a resistance against splitting in the traverse direction, is greatly improved as much.

While the exemplary embodiments have been shown and described, it will be understood by those skilled in the art that various changes and equivalents may be made thereto without departing from the spirit and scope of the present disclosure.

Therefore, it is intended that the present disclosure not be limited to the particular exemplary embodiments, but that various changes and modifications made by those having ordinary skill in the art using the basic concept of the present disclosure defined in the appended claims will fall within the scope of the present disclosure.

What is claimed is:

1. A manufacturing method of a concrete girder, comprising:

adjoining a first lower flange of a first Ultra High Performance Concrete (UHPC) side form member and a second lower flange of a second UHPC side form member with space between a first web of the first UHPC side form member extending perpendicular to the first lower flange and a second web of the second UHPC side form member extending perpendicular to the second lower flange, each of the first and second lower flanges is divided by the first and second webs into an inner flange extending inwards to define the space and an outer flange in a direction opposite to the inner flange;

placing in-situ uncured concrete in the space between the first web and the second web after adjoining the first lower flange and the second lower flange; and curing the placed concrete to form the concrete girder, the first and second webs forming side surfaces of the concrete girder, the first and second lower flanges forming a bottom portion of the concrete girder;

wherein concave portions are formed at an upper edge of the inner flange with an interval in the longitudinal direction, and a convex portion is formed between the concave portions, wherein a through hole is formed in the convex portion in the longitudinal direction, wherein a reinforcing bar having a loop shape is provided at the convex portion to protrude in a lateral direction, wherein when the first and second lower flanges are adjoined, the reinforcing bar is located in the concave portions, wherein a connection rod is provided through the through hole so that the connection rod is located at a bent inside of the reinforcing bar, and wherein when the concrete is poured in the space, the reinforcing bar and the connection rod are buried in the concrete.

2. A concrete girder, comprising:

a pair of Ultra High Performance Concrete (UHPC) side form members, each UHPC side form member having a lower flange and a web perpendicular to the lower flange, the UHPC side form members extending in a longitudinal direction and prepared with UHPC using a precast, lower flanges of the pair of UHPC side form members are adjoined to form space between webs of the pair of UHPC side form members, each of the lower flanges divided by the webs into an inner flange extending inwards to define the space and an outer flange extending in a direction opposite to the inner flange; and cured concrete between the pair of UHPC side form members formed by placing uncured concrete into the space with the lower flanges adjoined and curing the placed concrete wherein concave portions are formed at an upper edge of the inner flange with an interval in the longitudinal direction, and a convex portion is formed between the concave portions, wherein a through hole is formed in the convex portion in the longitudinal direction, wherein a reinforcing bar having a loop shape is provided at the convex portion to protrude in a lateral direction, wherein when the lower flanges are adjoined, the reinforcing bar is located in the concave portions, wherein a connection rod is provided through the through hole so that the connection rod is located at a bent inside of the reinforcing bar, and wherein when the concrete is poured in the space, the reinforcing bar and the connection rod are buried in the concrete.

* * * * *